Patented Oct. 26, 1943

2,332,820

UNITED STATES PATENT OFFICE 2,332,820

REFRIGERATION

Robert S. Taylor, Evansville, Ind., assignor to Servel, Inc., New York, N. Y., a corporation of Delaware Application January 10, 1940, Serial No. 313,181

21 Claims. (Cl. 62—119.5)

My invention relates to refrigeration and more particularly to heat operated refrigeration systems.

It is an object of the invention to provide a simplified refrigeration cycle making use of evaporation and absorption of refrigerant fluid.

In this cycle, refrigerant vapor is evaporated at high pressure and also at low pressure. The evaporation at low pressure produces refrigeration. The vapor from both high and low temperature evaporation is absorbed in an absorption liquid to form a strong solution of refrigerant fluid. Evaporation at the low temperature takes place from the strong solution, and evaporation at the high temperature takes place from the resulting weakened solution. Vapors from the high and low temperature evaporation are combined by aspirating action or injector action of the high temperature vapor upon the low temperature vapor.

Figure 1:
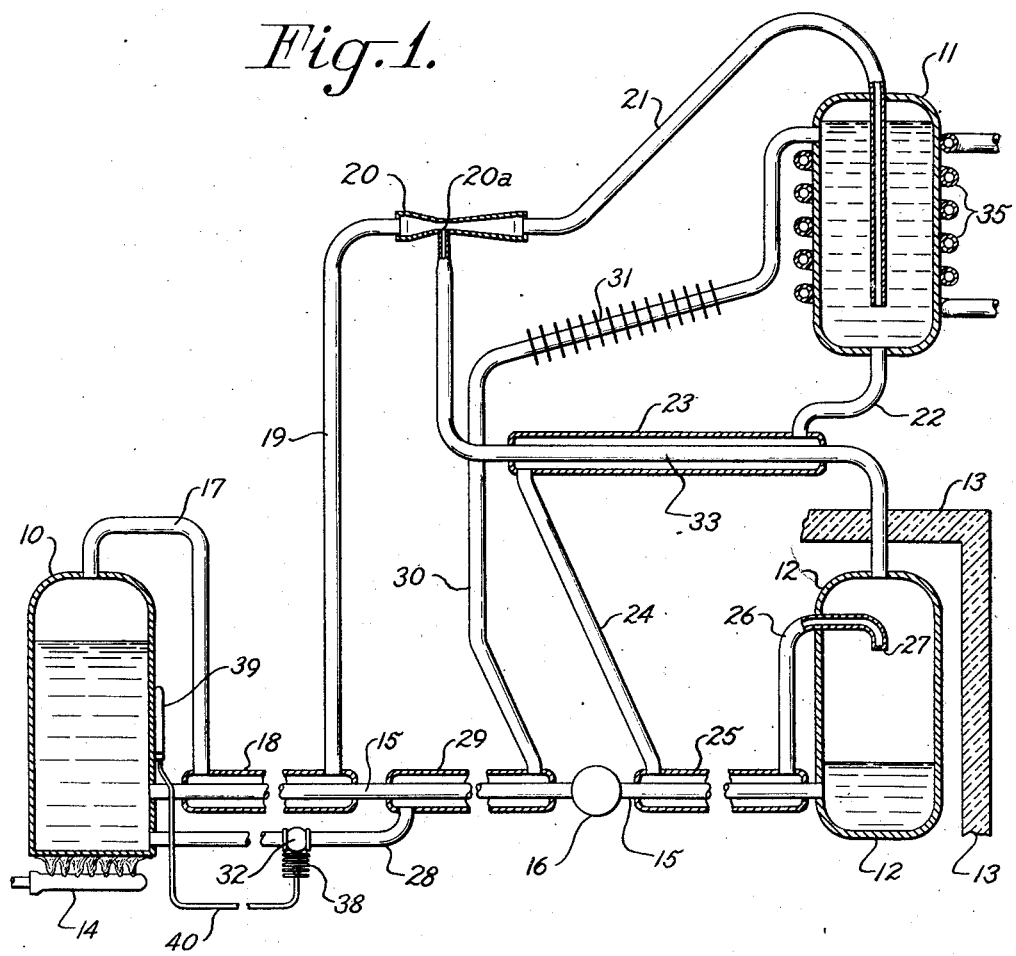
Figure 2:
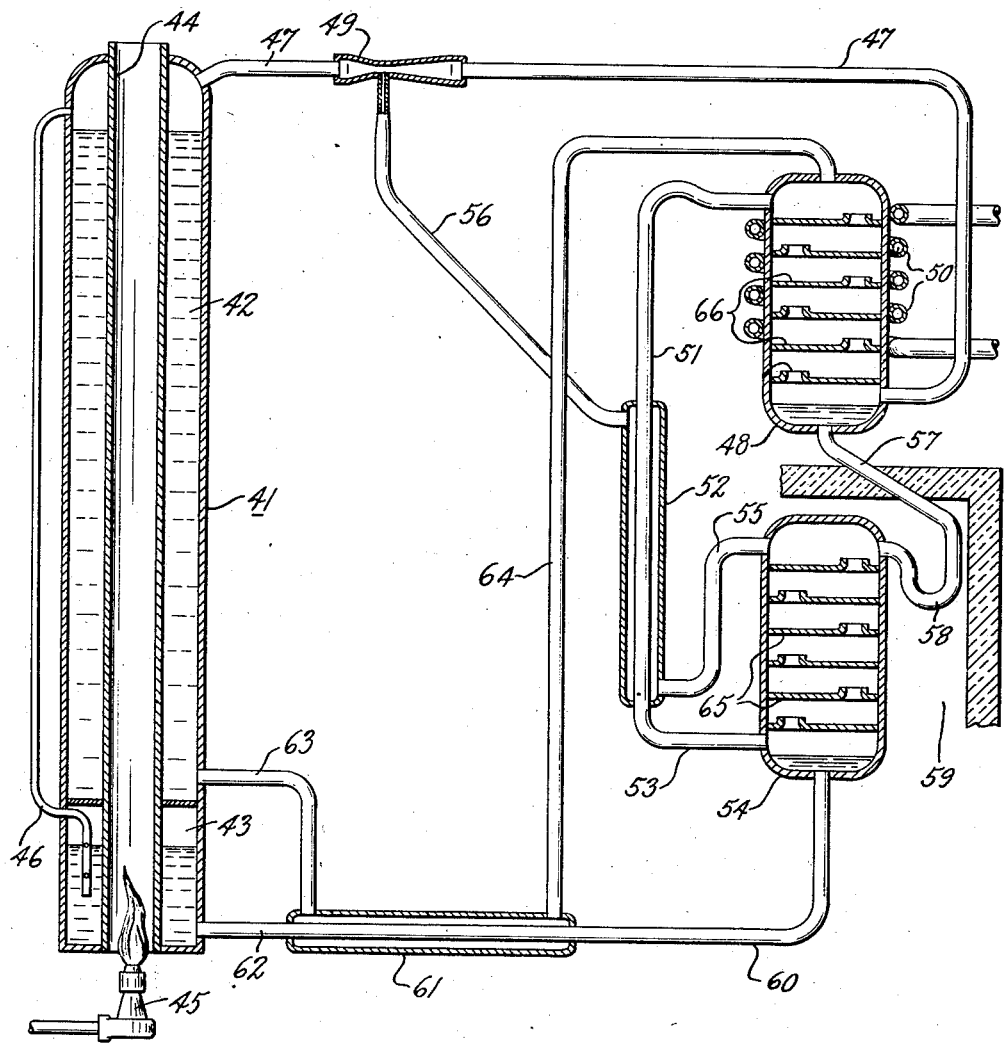

The invention will be more fully understood upon reference to the following description and accompanying drawings forming part of this specification, and of which Fig. 1 shows more or less diagrammatically a two fluid refrigeration system embodying the invention; and Fig. 2 shows more or less diagrammatically a three fluid refrigeration system embodying the invention.

Referring to Fig. 1, a refrigeration system includes a generator or boiler 10, an absorber 11, and an evaporator 12. The evaporator 12 is the cooling element of the system and is located in a place to be cooled 13. The generator 10 is heated by a suitable source of heat such as a gas burner 14. Generator 10 is connected to evaporator 12 by a conduit 15. Connected in conduit 15 is a suitable liquid pump 16 arranged to pump liquid through conduit 15 in the direction from the evaporator 12 toward the generator 10.

Around conduit 15 are three liquid jackets 18, 29, and 25. These jackets together with conduit 15 constitute three heat exchangers. The vapor space of generator 10 is connected by conduit 17, heat exchanger 18, a conduit 19, a Venturi tube 20, and a conduit 21 to the lower part of absorber 11. The lower part of generator 10 is connected by a conduit 28, heat exchanger 29, and conduit 30 to the upper part of absorber 11. A part 31 of pipe 30 is provided with heat transfer fins. The lower part of absorber 11 is connected by a conduit 22, a jacket 23, conduit 24, heat exchanger 25, and conduit 26 to the upper part of evaporator 12. The evaporator is connected by a conduit 33 to the suction inlet 20a of venturi 20.

Jacket 23 is located around conduit 33 and forms therewith a heat exchanger.

The absorber 11 is cooled by a water circulating coil 35. Fins for direct air cooling, or other suitable means for cooling the absorber may of course be used.

The end of conduit 26 which juts within the upper part of evaporator 12 is provided with a small orifice 27 constituting a flow restriction which may be made adjustable in any convenient manner such as in the case of known expansion valves. In conduit 28 is connected a regulating valve 32 operated by a thermostat responsive, for instance, to temperature of the generator 10. The thermostat for operating valve 32 is shown as a bellows 38 connected to a sensing bulb 39 by a capillary 40 and containing an expansible fluid.

The system contains a refrigerant fluid and an absorbent therefor such as ammonia and water. In operation, the burner 14 is lighted and pump 16 operated. Cooling water is circulated through the absorber cooling coil 35. Ammonia vapor is expelled from solution in generator 10. The vapor flows through conduit 17, heat exchanger 18, conduit 19, venturi 20, and conduit 21 into absorber 11. The vapor bubbles upward through liquid in absorber 11 and is absorbed into solution.

Strong or enriched solution flows from absorber 11 through conduit 22, heat exchanger jacket 23, conduit 24, heat exchanger 25, and conduit 26 into evaporator 12. The strong solution emerges from conduit 26 through orifice 27 and sprays into the evaporator 12. Ammonia evaporates from solution in evaporator 12, producing a refrigerating effect. The vapor flows through conduit 33 to the inlet 20a of venturi 20. The high and low temperature vapors join in venturi 20 and flow to the absorber as previously described. The venturi action maintains a lowered pressure in evaporator 12. Weakened solution is pumped from evaporator 12 through conduit 15 by pump 16, flowing through the heat exchangers 25, 29 and 18. Weakened solution from generator 10 flows under generator pressure through conduit 28, heat exchanger 29, and conduit 30 into absorber 11. Flow of weakened solution from generator 10 is controlled by valve 32 responsive to temperature of the generator.

The difference in temperatures of evaporation in generator 10 and evaporator 12 is due to the fact that the solution in evaporator 12 is more concentrated than the solution in generator 10, and the pressure in evaporator 12 is lower due to the action of the venturi 20.

Referring to Fig. 2, a generator 41 comprises an upper chamber 42 and a lower chamber 43. A flue 44 extends upward through chambers 42 and 43. A gas burner 45 is arranged so that the flame is projected upward into the flue 44 for heating of the generator. The lower end of a vapor lift conduit 46 projects downward into generator chamber 43. The upper end of conduit 46 is connected to the upper part of generator chamber 42.

The upper part of generator chamber 42 is connected by a conduit 47 to the lower part of an absorber 48. A venturi 49 is connected in conduit 47. Absorber 48 is provided with a cooling coil 50 for water cooling of the absorber. It of course may be air cooled or cooled by an intermediate heat transfer system.

The upper part of absorber 48 is connected by a conduit 51, a heat exchanger 52 and a conduit 53 to the lower part of an evaporator 54. The upper part of evaporator 54 is connected by a conduit 55, heat exchanger 52 and a conduit 56 to the suction inlet of venturi 49. A drain conduit 57 is connected from the bottom of absorber 48 to the top of evaporator 54. Drain conduit 57 is provided with a liquid trap 58.

Evaporator 54 is located in a place to be cooled 59. The bottom of evaporator 54 is connected by a conduit 60, a liquid heat exchanger 61 and a conduit 62 to the lower generator chamber 43. The upper generator chamber 42 is connected by a conduit 63, liquid heat exchanger 61 and conduit 64 to the top of absorber 48.

The system is hermetically sealed and contains refrigerant fluid, an absorbent therefor, and an auxiliary inert fluid. Ammonia, water, and hydrogen may be used. Before sealing the system, the water and ammonia are introduced as a solution and the hydrogen is introduced in its usual gaseous form.

In operation, burner 45 is lighted and cooling water circulated through absorber coil 50. Burner 45 may be thermostatically controlled, for instance, responsive to a temperature condition affected by evaporator 54. The burner heats generator 41 and ammonia vapor is expelled from solution in chambers 43 and 42. Vapor formed in chamber 43 accumulates until it escapes into vapor lift conduit 46. Vapor becomes interspersed with liquid in conduit 46 forming a light column of vapor and liquid which rises in the upper end of conduit 46 from which the liquid overflows into generator chamber 42 and the vapor joins the vapor expelled from solution in chamber 42.

Ammonia vapor flows from the upper part of generator chamber 42 through conduit 47 to absorber 48. Weakened solution flows from the lower part of generator chamber 42 through conduit 63, liquid heat exchanger 61, and conduit 64 into the upper part of absorber 48. The weakened absorption liquid flows downward over liquid spreading plates 66 in absorber 48 and absorbs ammonia vapor. The resulting enriched absorption liquid flows from the bottom of absorber 48 through conduit 57 into the upper part of evaporator 54.

Enrich solution flows downward over liquid spreading plates 65 in evaporator 54. Ammonia vapor evaporates from the strong solution and diffuses into the hydrogen atmosphere, producing a refrigerating effect for cooling space 59. The weakened solution flows from the bottom of evaporator 54 through conduit 60, liquid heat exchanger 61, and conduit 62 to the lower generator chamber 43. The mixture of ammonia vapor and hydrogen gas from evaporator 54 flows through conduit 55, heat exchanger 52, and conduit 56 to the suction inlet of venturi 49. The hydrogen and ammonia gas mixture joins the stream of ammonia vapor in venturi 49 and flows therewith through conduit 47 to absorber 48. The hydrogen or weak gas resulting from the previously described absorption of ammonia vapor in absorber 48 flows through conduit 51, heat exchanger 52 and conduit 53 back to evaporator 54.

The circulation of gas between absorber 48 and evaporator 54 is caused by the action of ammonia vapor flowing through venturi 49. This circulation may be carried out by an injector or even a plain jet. Ammonia evaporates from solution in generator 41 at substantially the total pressure in the system. Ammonia evaporates from solution in evaporator 54 at the partial pressure of ammonia vapor in the evaporator. The solution in evaporator 54 is enriched solution from absorber 48. Solution in generator chamber 43 is weakened solution from evaporator 54 and solution in generator chamber 42 is still weaker solution from chamber 43. Evaporation of ammonia vapor is therefore at a high temperature in generator 41 and at a low temperature in evaporator 54. Heat is conserved between liquid flowing to and from the generator 41 by the liquid heat exchanger 61. Heat is also conserved between gas flowing to and from evaporator 54 by heat exchanger 52.

Although two embodiments of the invention have been described, various changes and modifications may be made within the scope of the invention as indicated in the following claims.

What is claimed is:

1. A refrigeration system including a generator, an absorber, an evaporator, a conduit for liquid from said evaporator to said generator, a conduit for liquid from said absorber to said evaporator, and conduits for conducting all the vapor from both said generator and said evaporator to said absorber.

2. A refrigeration system including a generator, an absorber, an evaporator, a conduit for liquid from said evaporator to said generator, a conduit for liquid from said absorber to said evaporator, a conduit for conducting all the vapor from said generator to said absorber, an aspirator in said last conduit, and a conduit for vapor from said evaporator to said aspirator.

3. A refrigeration system including a generator, an absorber, an evaporator, a conduit for liquid from said evaporator to said generator, a conduit for liquid from said absorber to said evaporator, a conduit for conducting all the vapor from said generator to said absorber, and means utilizing flow of vapor in said last conduit to cause flow of vapor from said evaporator to said absorber.

4. A refrigeration system including a generator, an absorber, an evaporator, a conduit for liquid from said evaporator to said generator, a conduit for liquid from said absorber to said evaporator, and means to conduct all the vapor from said generator to said absorber operative by flow of vapor therethrough to withdraw vapor from said evaporator.

5. In a refrigeration system of the type utilizing a refrigerant and a solvent therefor, the combination of a generator, an absorber, and an evaporator, means including a first heat exchanger for interconnecting said evaporator and said generator for flow of weak solution to said generator, means including a second heat exchanger for interconnecting said absorber and said evaporator, means including said first heat exchanger for interconnecting said generator and said absorber for flow of weaker solution to said absorber, means for delivering all refrigerant driven off in said generator to said absorber, and means operable by the flow of said generated refrigerant for withdrawing refrigerant evaporated within said evaporator.

6. In a refrigeration system of the type utilizing a refrigerant and solvent therefor, the combination of a generator, an absorber, and an evaporator, means including a first heat exchanger for interconnecting said evaporator and said generator for flow of weak solution to said generator, means including a second heat exchanger for interconnecting said evaporator and said absorber, means including said first heat exchanger for interconnecting said generator and said absorber for flow of weaker solution to said absorber, means for delivering all refrigerant driven off in said generator to said absorber, means for delivering solution strong in refrigerant from said absorber to said evaporator, and means operable by the flow of said refrigerant from said generator for withdrawing from said evaporator and through said second heat exchanger refrigerant evaporated within said evaporator.

7. In a refrigeration system of the type utilizing a refrigerant and a solvent therefor, the combination of a generator, an absorber, and an evaporator, means including a first heat exchanger for interconnecting said evaporator and said generator for flow of weak solution to said generator, means including a second heat exchanger for interconnecting said evaporator and said absorber, means including said first heat exchanger for interconnecting said generator and said absorber for flow of weaker solution to said absorber, means for delivering all refrigerant driven off in said generator to said absorber, and means operable by the flow of said refrigerant from said generator for continuously withdrawing refrigerant evaporated within said evaporator and for delivering the same to said absorber in mixture with the refrigerant from said generator.

8. In a refrigeration system, the combination of an evaporator, an absorber for delivering a solution strong in refrigerant to said evaporator, a generator, and connections therefrom for delivering refrigerant in vapor phase and a solution weak in refrigerant to said absorber including means for delivering all the refrigerant from said generator to said absorber in mixture with vaporized refrigerant from said evapoator.

9. In a refrigeration system, the combination of a generator, an evaporator, and an absorber disposed at a level above said evaporator for supplying to said evaporator a liquid containing a relatively high percentage of refrigerant, means for delivering from said generator two fluid streams to said absorber one comprising all the refrigerant in vapor phase produced by said generator and the other comprising liquid containing a relatively low percentage of refrigerant, and means operable by flow of one of said streams for producing a low pressure zone into which vaporized refrigerant from said evaporator is continuously withdrawn.

10. A system as set forth in claim 9, in which pressure reducing means is included between said absorber and said evaporator to reduce the pressure within said evaporator with respect to that within said absorber.

11. A system as set forth in claim 9, in which means including a gas heat exchanger interconnect said evaporator and absorber for circulation of inert gas therebetween, and in which said means operable by one of said streams produces circulation of said inert gas to and from said evaporator.

12. The method of refrigerating by the aid of a system including a generator, an absorber, and an evaporator through and between which three elements is circulated an absorbent, which includes expelling refrigerant vapor froms aid absorbent in said generator, flowing all the expelled vapor to said absorber, and utilizing said flow of vapor to withdraw vaporized refrigerant from the evaporator and deliver the vaporized refrigerant in mixture with the vapor from the generator to the absorber.

13. A refrigeration system comprising a generator, an absorber, an evaporator, conduits forming circuits with said elements in which absorption liquid flows from said generator through said absorber and then through said evaporator and back to the generator, and all refrigerant fluid from said generator flows to said absorber, and conduits forming with said evaporator and said absorber a circuit for an inert pressure equalizing medium, and a fluid flow producer operated by flow of refrigerant from said generator to said absorber for producing flow of said pressure equalizing medium through its said circuit.

14. A refrigeration system comprising a generator, an absorber, an evaporator, conduits interconnecting said elements and forming therewith circuits for flow of absorption liquid from said generator through said absorber and said evaporator and back to the generator, and flow to said absorber of all refrigerant fluid from said generator, conduits forming with said evaporator and said absorber a circuit for an inert pressure equalizing medium, and a fluid flow producer operated by flow of refrigerant fluid from said generator to said absorber for producing flow of said pressure equalizing medium through its said circuit at a rate which varies with the rate of flow of refrigerant.

15. A refrigeration system comprising an evaporator, an absorber, conduits forming with said evaporator and absorber a path of flow in which solution of refrigerant flows from said absorber to said evaporator, and a conduit for conducting vaporous refrigerant fluid to said absorber, said conduit including a device operated by flow of refrigerant to said absorber to withdraw refrigerant vapor from said evaporator at a certain total pressure and raise the pressure of the withdrawn vapor to a higher total pressure corresponding to the total pressure of refrigerant vapor entering said absorber.

16. A refrigeration system comprising a generator from which refrigerant vapor is delivered, an absorber which receives refrigerant vapor delivered by said generator, an evaporator, conduits interconnecting said generator, absorber, and evaporator for circulation of absorption medium from the generator through said absorber and through said evaporator and back to the generator, a device operated by said delivery of refrigerant from said generator to said absorber for withdrawing refrigerant vapor from said evaporator at a certain pressure and raising the total pressure of the withdrawn vapor to a value corresponding to the total pressure of the refrigerant delivered to said absorber, and a device for permitting said flow of absorption medium in its path of flow from said absorber to said evaporator to take place from the higher pressure in said absorber to said certain lower pressure in said evaporator.

17. That improvement in the art of refrigerating with the aid of a system including an absorber and an evaporator and in which an absorbent flows from a higher total pressure in said absorber to a lower total pressure in said evaporator, which consists in flowing refrigerant vapor to the absorber, and utilizing said flow of refrigerant vapor to withdraw refrigerant vapor from said evaporator and raise the total pressure of the withdrawn vapor to a value corresponding to the total pressure of the refrigerant vapor entering said absorber.

18. A method of refrigeration which includes evaporating refrigerant fluid from solution to produce a refrigerating effect, separately evaporating further refrigerant fluid from the resulting weakened solution at a higher temperature to form more vaporous refrigerant and to further weaken the solution, combining all the refrigerant vapors from both said evaporating steps by aspirating action of all the vapor from said second evaporating step upon vapor from said first evaporating step, absorbing the combined refrigerant vapors into weakened absorption solution produced by said second evaporation step, and supplying the resulting enriched solution for said first evaporation step.

19. A method of refrigeration as set forth in claim 18 in which said first evaporating step is carried out in the presence of an inert fluid.

20. A method of refrigeration which includes evaporating refrigerant fluid from solution to produce a refrigerating effect, separately evaporating further refrigerant fluid from the resulting weakened solution at a higher temperature to form more vaporous refrigerant and to further weaken the solution, combining the refrigerant vapors from said evaporating steps by the aspirating action of vapor from said second evaporating step upon vapor from said first evaporating step, utilizing said aspirating action to lower the pressure for said first evaporating step, absorbing said combined refrigerant vapors into weakened absorption solution produced by said second evaporation step, and supplying the resulting enriched solution for said first evaporation step.

21. A method of refrigeration which includes evaporating refrigerant fluid from solution to produce a refrigerating effect, separately evaporating further refrigerant fluid from the resulting weakened solution at a higher temperature to form more vaporous refrigerant and to further weaken the solution, combining the refrigerant vapors from said evaporating steps by aspirating action of vapor from said second evaporating step upon vapor from said first evaporating step, absorbing said combined refrigerant vapors by bubbling through weakened absorption solution produced by said second evaporation step, and supplying the resulting enriched solution for said first evaporation step.

ROBERT S. TAYLOR.